United States Patent [19]

Akabane et al.

[11] Patent Number: 4,930,567
[45] Date of Patent: Jun. 5, 1990

[54] DAMPER MOTOR CONTROL CIRCUIT FOR AN AUTOMOTIVE AIR CONDITIONING SYSTEM

[75] Inventors: Hidemitsu Akabane, Takasaki; Toshimi Isobe, Isesaki; Seiichi Hoshino, Nitta, all of Japan

[73] Assignee: Sanden Corporation, Gunma, Japan

[21] Appl. No.: 221,879

[22] Filed: Jul. 20, 1988

[30] Foreign Application Priority Data

Jul. 20, 1987 [JP] Japan .................. 62-110013[U]

[51] Int. Cl.⁵ .................. F25B 29/00; G05B 1/06
[52] U.S. Cl. .................. 165/25; 165/24; 165/42; 165/43; 318/434
[58] Field of Search .................. 165/12, 24, 25, 42, 165/43; 318/434, 467, 469; 361/23; 281/129.04, 129.08

[56] References Cited

U.S. PATENT DOCUMENTS

| | | |
|---|---|---|
| 3,658,244 | 4/1972 | Caldwell . |
| 3,934,642 | 1/1976 | Coulson et al. . |
| 4,311,190 | 1/1982 | Walley .................. 165/25 |
| 4,326,386 | 4/1982 | Tamura . |
| 4,352,452 | 10/1982 | Shimada .................. 165/24 |
| 4,393,342 | 7/1983 | Matsuoka et al. .................. 318/467 |
| 4,442,885 | 4/1984 | Matsuzaki .................. 165/25 |
| 4,539,821 | 9/1985 | Tamura . |
| 4,591,773 | 5/1986 | Numata .................. 318/434 |
| 4,678,975 | 7/1987 | Vrabel et al. .................. 318/469 |

FOREIGN PATENT DOCUMENTS

58-141916 8/1983 Japan .
58-218417 12/1983 Japan .
58-218420 12/1983 Japan .

Primary Examiner—John Ford
Attorney, Agent, or Firm—Banner, Birch, McKie & Beckett

[57] ABSTRACT

An automotive air conditioning control system comprises a first control circuit for automatically controlling an angle of an air mix damper in accordance with a plurality of variable conditions, for example, an outside air temperature and an inside air temperature. A switching mechanism predetermines either a maximum heating or cooling when closed. A second control circuit moves the air mix damper to a position for either maximum heating or cooling independently of the variable conditions responsive to operation of the switching mechanism. The second control circuit includes a signaling circuit which outputs a drive signal to control the movement of the air mix damper to the position for maximum heating or cooling for only a predetermined period of time. Therefore, even though the air mix damper or a gear for reducing motor speed becomes locked at the time of maximum heating or cooling and a lock detecting function of a microcomputer of the first control circuit fails to operate, a motor of a motor actuator for moving the air mix damper is saved from destruction.

4 Claims, 3 Drawing Sheets

| INPUT | | OUTPUT | | MOTOR ACTUATOR |
|---|---|---|---|---|
| e | f | g | h | ROTATING DIRECTION |
| 0 | 0 | 0 | 0 | STOP |
| 1 | 0 | 1 | 0 | REVERSE ROTATING DIRECTION |
| 0 | 1 | 0 | 1 | FORWARD ROTATING DIRECTION |
| 1 | 1 | 0 | 0 | STOP |

DAMPER MOTOR CONTROL CIRCUIT FOR AN AUTOMOTIVE AIR CONDITIONING SYSTEM

This application is related by subject matter to commonly assigned copending application Ser. No. 220,740 filed July 18, 1988 having common inventors and application Ser. No. 22/880 filed concurrently herewith having common inventors.

BACKGROUND OF THE INVENTION

1. TECHNICAL FIELD

This invention relates generally to automotive air conditioning control systems, and more particularly, to an automotive air conditioning control system which controls the temperature of the air flow to a passenger compartment by means of an air mix damper driven by a motor actuator for a maximum predetermined period of time.

2. DESCRIPTION OF THE RELEVANT ART

A conventional automotive air conditioning system which includes an automatic air temperature control function is provided with a first control circuit. The first control circuit comprises a microcomputer for computing a desired open angle of an air mix damper in accordance with a preset temperature, an outside air temperature, an inside air temperature and other variable conditions. The control circuit drives the air mix damper to the desired open angle by actuating a drive device, for example, a motor actuator, and thereby controls the temperature of the air flow provided to the passenger compartment.

In the conventional air conditioning system, when a lever or other means for setting the temperature of the air flow to the passenger compartment is positioned at either maximum heating or cooling, the air mix damper is forcedly moved to the position for either maximum heating or cooling, respectively and independently of the variable conditions.

However, when the air mix damper becomes locked due to the introduction of foreign matter or a gear for reducing motor speed of a motor of the motor actuator becomes locked for some reason, the locking may mechanically be transferred to the motor actuator whose motion also becomes locked. If events happen for the worst, the motor of the motor actuator may be destroyed and result in a fire. In order to prevent these problems of the conventional control system, a lock detecting function is included in the first control circuit which cuts off the supply of electricity automatically in accordance with lock detection signals transmitted to the microcomputer of the first control circuit.

However, since the control for the maximum heating or cooling is the responsibility of the second control circuit and not that of the microcomputer, the lock detecting function may fail to operate.

SUMMARY OF THE INVENTION

It is one object of the present invention to provide an automotive air conditioning control system which can suitably control the temperature of the air flow to a passenger compartment.

It is another object of the present invention to provide an automotive air conditioning control system which can prevent destruction of a motor of a motor actuator even though an air mix damper or gear for reducing motor speed becomes locked at the time of maximum heating or cooling and a lock detection function of a microcomputer fails to operate.

An automotive air conditioning system according to the present invention includes a first control circuit for automatically controlling an open angle of an air mix damper in accordance with a plurality of variable conditions for example, an outside air temperature and an inside air temperature. A switching mechanism predetermines either a maximum heating or cooling. A second control circuit moves the air mix damper to a position for either maximum heating or cooling respectively and independent of the variable conditions in accordance with operation of the switching mechanism. The second control circuit includes a drive circuit which outputs a motor drive signal to move the air mix damper to the position for maximum heating or cooling for a maximum predetermined period of time. Furthermore, the maximum predetermined period of time of motor operation may be determined by the length of time required for the motor to move the air mix damper between a maximum cooling and a maximum heating position.

Further objects, features and other aspects of this invention will be readily understood from the following detailed description of a preferred embodiment.

DETAILED DESCRIPTION

Figure 1:
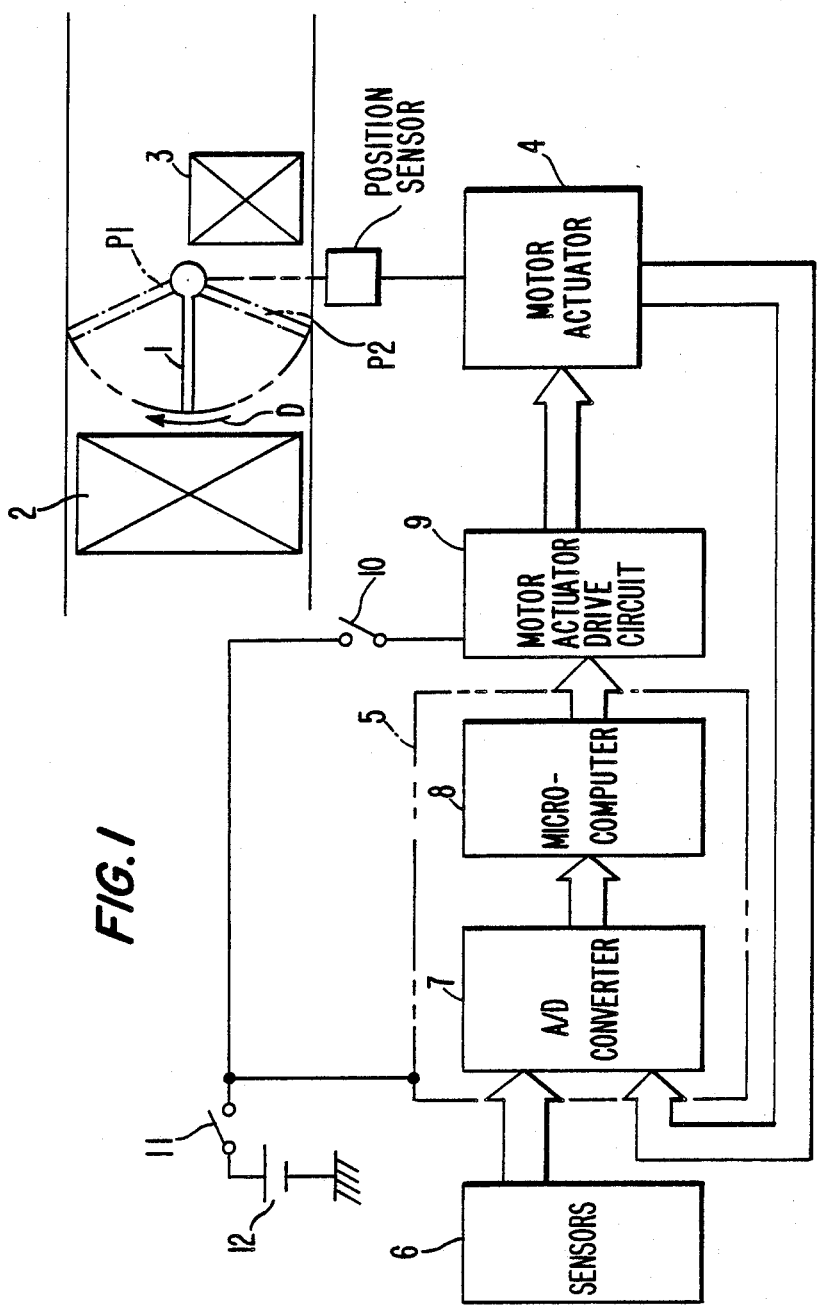
FIG. 1 is a schematic view of an automotive air conditioning control system in accordance with one embodiment of this invention.

With reference to FIG. 1, a schematic view of an automotive air conditioning system in accordance with one embodiment of the present invention is shown.

Air mix damper 1 is disposed behind evaporator or condenser 2 and controls the volume of air which is blown toward heater core 3. In this manner, the temperature of the air flow to a passenger compartment is controlled. Motor actuator 4 is coupled with air mix damper 1 through a wire or other link to vary an open angle of air mix damper 1. When the air mix damper is positioned at P1, the automotive air conditioning system is at maximum heating and when air mix damper 1 is positioned at P2, the system is at maximum cooling. A potentiometer (not shown) is disposed at a motor actuator 4 so as to electrically output a damper position signal from motor actuator 4.

First control circuit 5 for automatically controlling the temperature of the air blown into a passenger compartment controls operation of a damper motor of motor actuator 4 in accordance with a control program which is stored in microcomputer 8. A plurality of sensors 6, for example, for sensing an inside air temperature, an outside air temperature, a condenser output temperature, a water temperature, and the degree of insolation as well as a temperature setting device is coupled to microcomputer 8 via an analog to digital converter 7. Microcomputer 8 also receives damper position indicating signals from the potentiometer of motor actuator 4 via analog to digital converter 7. Microcomputer 8 in turn is coupled to motor actuator 4 via motor actuator drive circuit 9. Air mix damper 1 is driven in the direction of arrow D from maximum cooling position P2 to maximum heating position P1 when motor actuator 4 outputs a positive position signal by convention.

Maximum heating set switch 10 which is disposed on a temperature setting lever or other device is connected to motor actuator drive circuit 9 and is closed when the lever is set to maximum heating. Set switch 10 when closed may alternatively indicate a maximum cooling. A second control circuit comprises maximum heating set switch 10 and motor actuator drive circuit 9. The second control circuit actuates the movement of air mix damper 1 to the maximum heating position P1 independently of signals output from sensors 6. Ignition switch 11 connects maximum heating set switch 10 with automotive battery 12.

Figure 2:
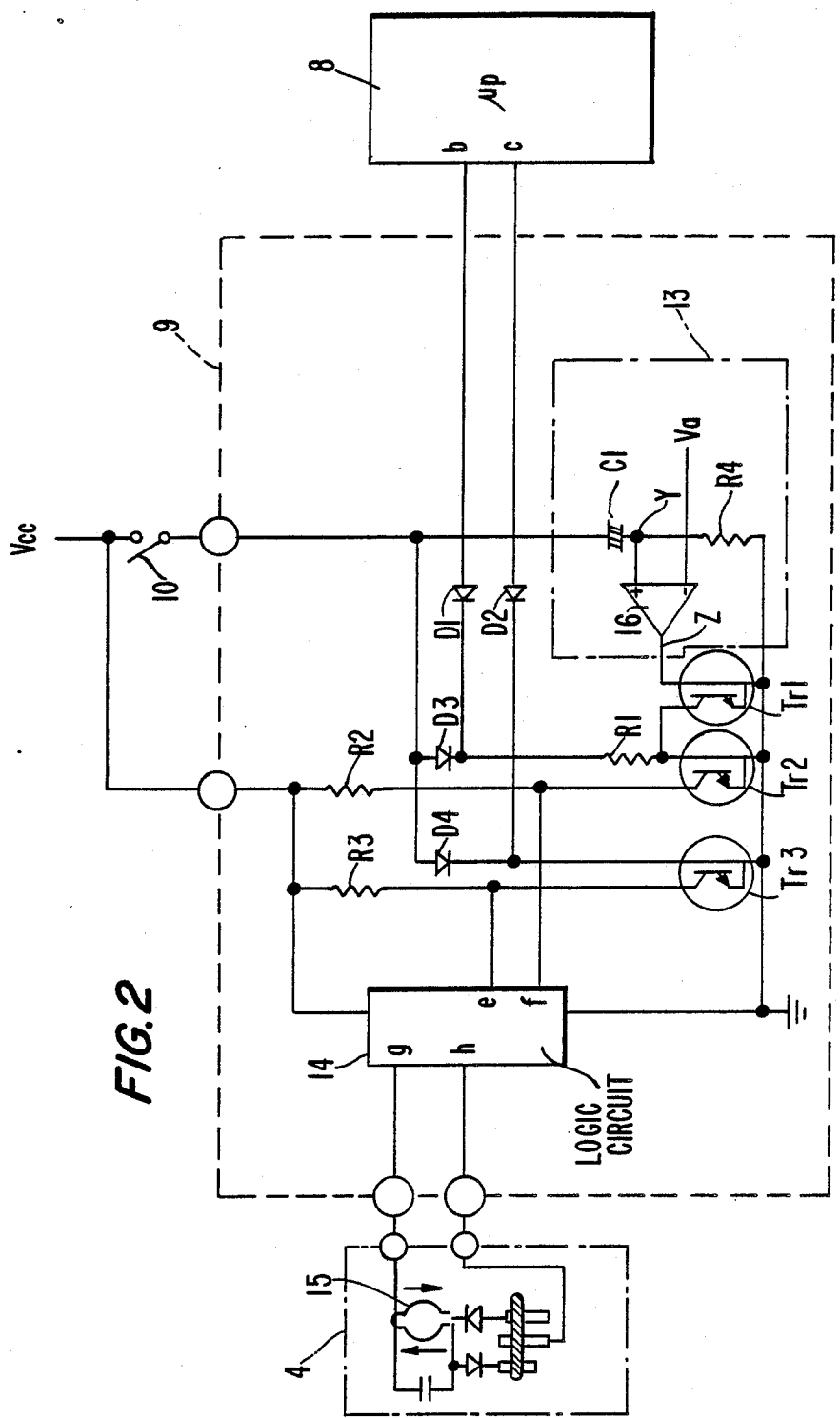
FIG. 2 is a circuit diagram of the motor actuator drive circuit 9 shown in FIG. 1.

With reference to FIG. 2, a circuit design of motor actuator drive circuit 9 is shown. Also shown is motor actuator 4 comprising reversible rotation motor 15 and microcomputer 8 of the first control circuit 5 (FIG. 1).

Logic circuit 14 which may comprise an integrated circuit comprises four control terminals; two terminals are input terminals e and f and the other two terminals are output terminals g and h. The logic relationship among inputs e and f, outputs g and h, and a rotating direction of motor 15 of motor actuator 4 is described in FIG. 4.

Figures 3, 4:
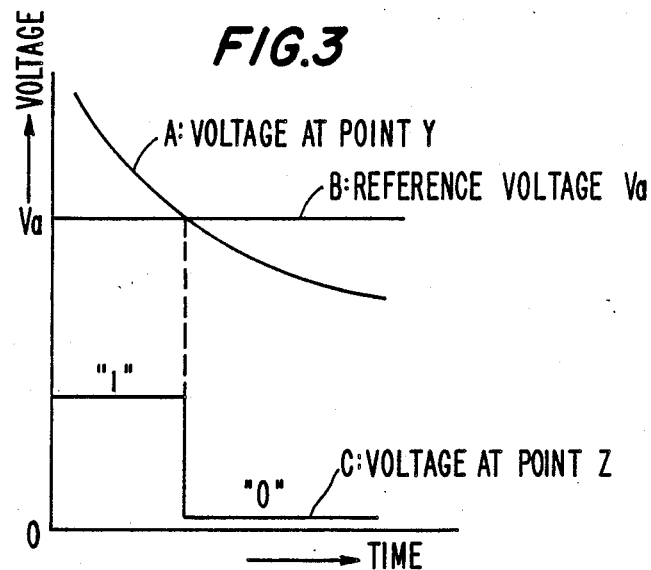
FIG. 3 is a graph showing the relationship between time and voltage for control and output signals of comparator 16 of the motor actuator drive circuit of FIG. 2.
FIG. 4 is a table describing the operation of the motor actuator and the output of logic circuit 14 in accordance with the input to logic circuit 14.

The operation of motor actuator 4 in a reverse rotating automatic control is now described in reference to FIG. 4 and FIG. 2. Switch 10 is presumed open at this time. When motor 15 of motor actuator 4 is rotated in a reverse rotating direction, signals "1" and "0" are output from ports b and c of microcomputer 8, respectively. Signal "1" output from port b is input to a base of transistor Tr2 through diode D1 and resistor R1. Since transistor Tr1 is normally off, transistor Tr2 is turned on. Power source voltage Vcc is applied to a collector of transistor Tr2 since transistor Tr2 is on, and thereby signal "0" output from part b is input to input terminal f of logic circuit 14. Likewise,, since signal "0" is output from port c to the base of transistor Tr3, transistor Tr3 is turned off. Power source voltage Vcc is supplied to a collector of transistor Tr3 through resistor R3. Since transistor Tr3 is off, signal "1" is input to input terminal e of integrated circuit 14. According to FIG. 4, then, signals "1" and "0" are output from output terminals g and h, respectively, and motor 5 is rotated in a reverse rotating direction.

Now, forward rotating motor operation is described. Again switch 10 is presumed to be open. When motor 15 of motor actuator 4 is rotated in a forward rotating direction, signals "0" and "1" are output from ports b and c of microcomputer 8, respectively. Accordingly, transistor Tr2 is turned off and transistor Tr3 is turned on, and signals "0" and "1" are input to input terminals e and f of logic circuit 14, respectively. Again referring to FIG. 4, signals "0" and "1" are output from output terminals g and h of integrated circuit 4, respectively, and thereby motor 15 is operated in a forward rotating direction.

The rotation of the motor 15 of motor actuator 4 during a condition of maximum heating (or alternatively cooling) is now described. When a lever or other device for setting temperature of the air blown into the passenger compartment is positioned at a maximum heating (or, alternatively a cooling), switch 10 is closed. Consequently, power source voltage Vcc is applied to non-inverting input terminal (+) of comparator 16 of timing circuit 13. Accordingly, signal "1" is output from output terminal Z of comparator 16 for a predetermined period of time, and transistor Tr1 is turned on. Transistor Tr2 is thus turned off by transistor Tr1 in spite of input from port b of microcomputer 8, and signal "1" is input to input terminal f of logic circuit 14 for the predetermined period of time. Power source voltage Vcc is also applied to a base of transistor Tr3 through diode D4, and thereby transistor Tr3 is turned on in spite of input from port c of microcomputer 8, and signal "0" is input to input terminal e of logic circuit 14. After the predetermined period of time lapses, signal "0" is output from output terminal Z of comparator 16. Accordingly, transistor Tr1 is turned off and transistor Tr2 is turned on regardless of input from port b of microcomputer 8 since power source voltage Vcc is applied to the base of transistor Tr2 through diode D3. Signal "0" is thus input to input terminal f of logic circuit 14. The supply of power source voltage Vcc to transistor Tr3 is continuously maintained, and so signal "0" is also continuously input to input terminal e of logic circuit 14. Therefore, referring to FIG. 4 and the result of a 0, 0 input at terminals e, f respectively, motor 15 is stopped.

As mentioned above, after switch 10 is closed, signals "0" and "1" are input to input terminals e and f of logic circuit 14, respectively, for only a predetermined period of time in spite of output from ports b and c of microcomputer 8. After the predetermined period of time lapses, signals "0" and "0" are input to input terminals e and f, and motor 15 is stopped, that is, a signal for forward rotating directional control of motor 15 lasts for only the predetermined period of time. The predetermined time, that is, the delay in operating timing circuit 13 is predetermined to be the approximate length of time required for air mix damper 1 to move between positions for maximum cooling and maximum heating.

The delayed operation of timing circuit 13 is described below in reference to FIG. 3. When switch 10 is closed and power source voltage is applied to timing circuit 13, the voltage at point Y is indicated by curve A as shown in FIG. 3 in accordance with the charging characteristic of condenser C1 in view of resistor R4. Comparator 16 operates as a differential amplifier. The voltage at point Y is applied to non-inverting input terminal (+) of comparator 16 and reference voltage Va, indicated by straight line B shown in FIG. 3 is applied to inverting terminal (−). Accordingly, as shown by line C in FIG. 3, when the voltage at point Y is higher than the reference voltage Va, signal "1" is output from output terminal Z of comparator 16 operating as a differential amplifier. Otherwise, signal "0" is output from output terminal Z of comparator 16.

According to the above described construction and operation, when a maximum heating (or cooling) position is established by switch 10, even though the air mix damper 1 or a gear for reducing motor speed becomes locked for some reason, since a motor drive signal is output from logic circuit 14 to motor actuator 4 for only the time it would take for the damper to move from one maximum position to the other, the motor of motor actuator 4 is saved from destruction.

The present invention has been described in detail in connection with one preferred embodiment, but this embodiment is merely exemplary, and the invention should not be construed as limited thereto. It should be apparent to those skilled in the art that other variations or modifications can be made within the scope of the following claims.

I claim:

1. An automotive air conditioning control system comprising:
   (a) an air mix damper capable of positional movement for regulating the temperature of air to a passenger compartment and having means for providing damper position signals;
   (b) a first control circuit for outputting signals for controlling the position of the air mix damper, the first control circuit being responsive to a plurality of variable conditions including at least damper position, indicated by said means for providing damper position signals, an inside air temperature and an outside air temperature,
   the first control circuit comprising:
   a plurality of sensors for sensing at least the inside and outside air temperature conditions,
   an analog to digital converter for converting the outputs of the plurality of sensors and the damper position signals to digital signals, and
   a processor for receiving the digital signals output of the analog to digital converter and having means for outputting signals to control movement of the air mix damper to a desired position;
   (c) a switch for commanding a maximum air condition; and
   (d) a second control circuit, responsive to said switch, having means for controlling movement of the air mix damper to a maximum position when said switch commands said maximum air condition, the second control circuit comprising:
   a logic circuit having first and second inputs and first and second outputs, signals at the first and second inputs determining a forward operating movement of the air mix damper, a reverse operating movement of the air mix damper or no movement, the logic circuit being normally responsive to the means for outputting signals of the first control circuit and
   a signal override circuit, responsive to the switch and coupled between the first control circuit and the logic circuit, the signal override circuit having means for inputting a no movement signal to the logic circuit to disable movement of the air mix damper after a maximum predetermined time period from when said switch commands said maximum condition has elapsed and while said switch continues to command said maximum condition regardless of the operation of the means for outputting signals of the first control circuit.

2. The automotive air conditioning control system of claim 1 wherein said maximum predetermined time period is approximately equal to the time required for said air mix damper to move between maximum and minimum positions for maximum and minimum air conditioning respectively.

3. The automotive air conditioning control system of claim 2, the second control circuit further comprising a timing circuit responsive to the switch for actuating the signal override circuit.

4. The automotive air conditioning control system of claim 1, the second control circuit further comprising a timing circuit responsive to the switch for actuating the signal override circuit.

* * * * *